United States Patent [19]

Nilsson

[11] Patent Number: 5,039,196
[45] Date of Patent: Aug. 13, 1991

[54] OPTICAL FIBER CABLE PULLING EYE

[75] Inventor: Richard C. Nilsson, Hickory, N.C.

[73] Assignee: Alcatel NA Cable Systems, Inc., Claremont, N.C.

[21] Appl. No.: 468,469

[22] Filed: Jan. 22, 1990

[51] Int. Cl.$^5$ .............................................. G02B 6/44
[52] U.S. Cl. ..................................... 385/136; 174/79; 254/134.3 FT; 385/100
[58] Field of Search ......................... 350/96.20, 96.33; 254/134.3 FT; 174/79

[56] References Cited

U.S. PATENT DOCUMENTS

| | | | |
|---|---|---|---|
| 4,337,923 | 7/1982 | Smith | 174/79 X |
| 4,496,212 | 1/1985 | Harvey | 174/79 X |
| 4,770,491 | 9/1988 | Champa et al. | 174/79 X |

FOREIGN PATENT DOCUMENTS

| | | | |
|---|---|---|---|
| 1037238 | 8/1978 | Canada | 174/79 |
| 1037684 | 9/1978 | Canada | 174/79 |
| 1138176 | 12/1982 | Canada | 174/79 |
| 1146936 | 5/1983 | Canada | 174/79 |

OTHER PUBLICATIONS

Fiberoptic Pulling Eye Assembly; U.S. Jep Corp.

Primary Examiner—John D. Lee
Assistant Examiner—Stephen W. Barns
Attorney, Agent, or Firm—Peter C. Van Der Sluys

[57] ABSTRACT

A pulling eye assembly for optical fiber cables is formed of a housing having a gripping device for gripping the multiple strength members. The first embodiment uses longitudinally extending cavities which communicate with radially directed threaded set-screw holes for receiving epoxy and/or set-screws. In the second embodiment, a pair of collets are used to grip the strength members. In both cases, a crimping sleeve is attached to an end of the cylindrical housing and being crimpably engageable with an outer surface of an optical fiber cable.

8 Claims, 3 Drawing Sheets

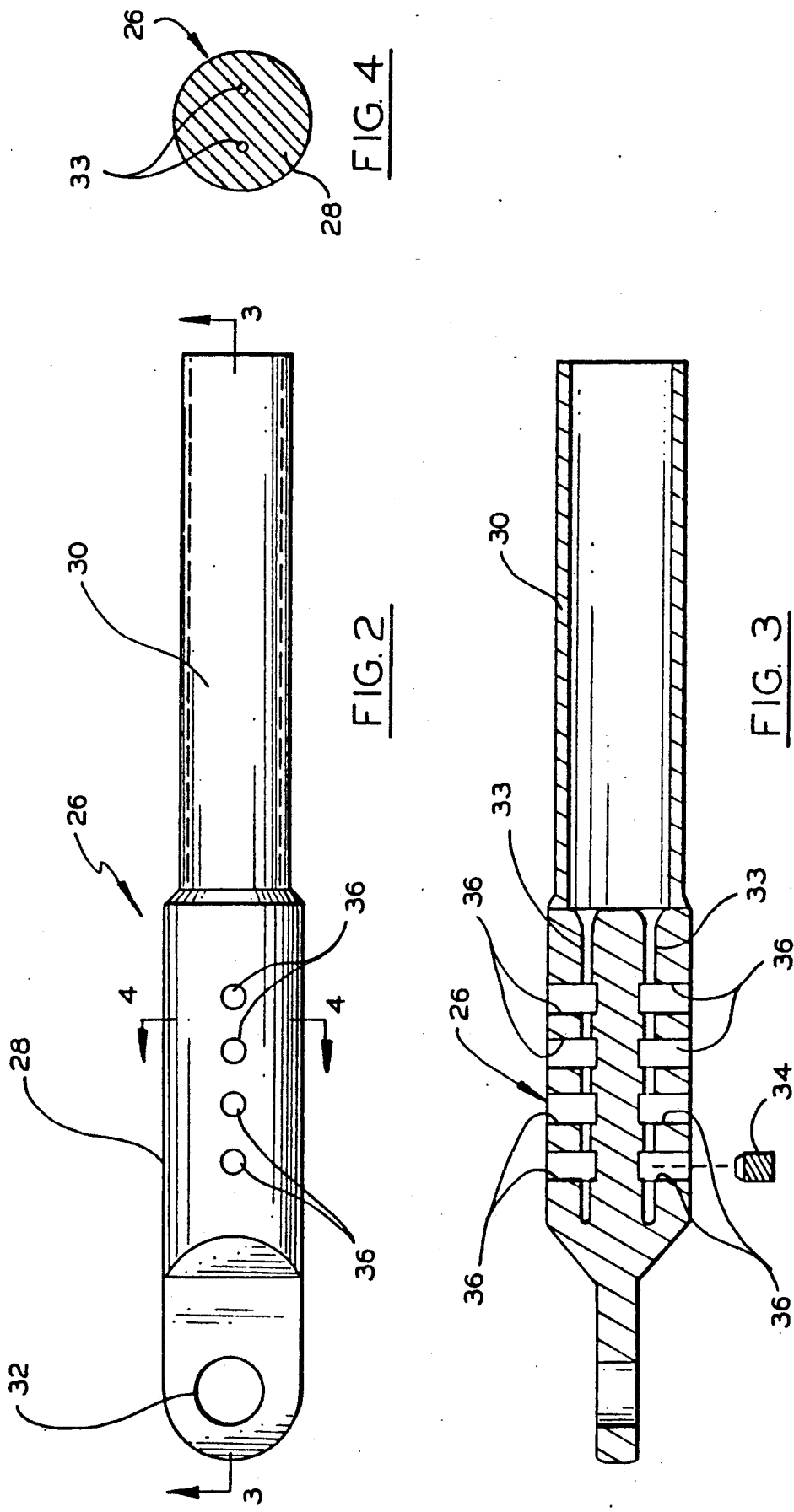

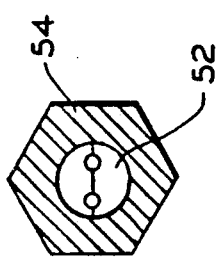
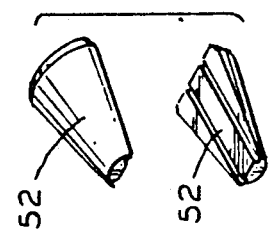
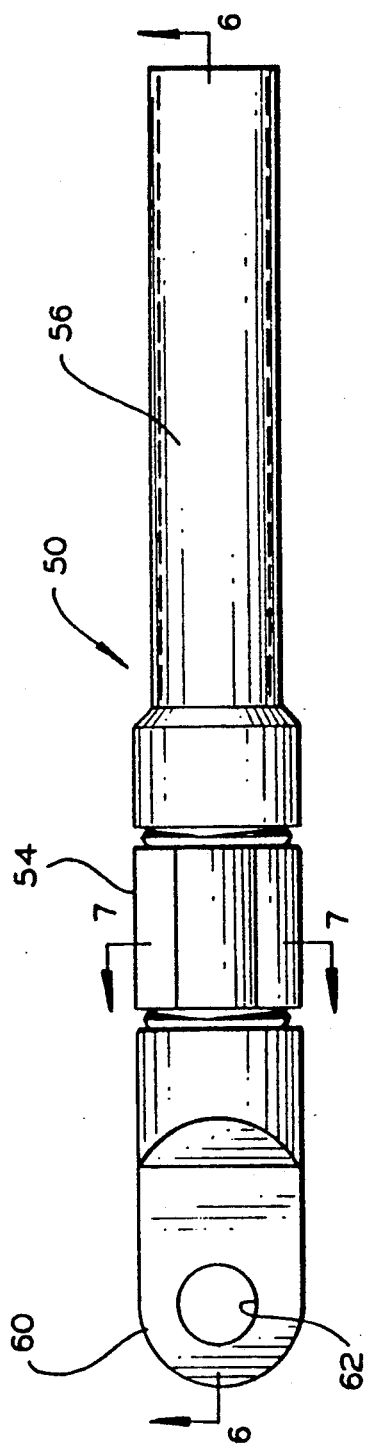
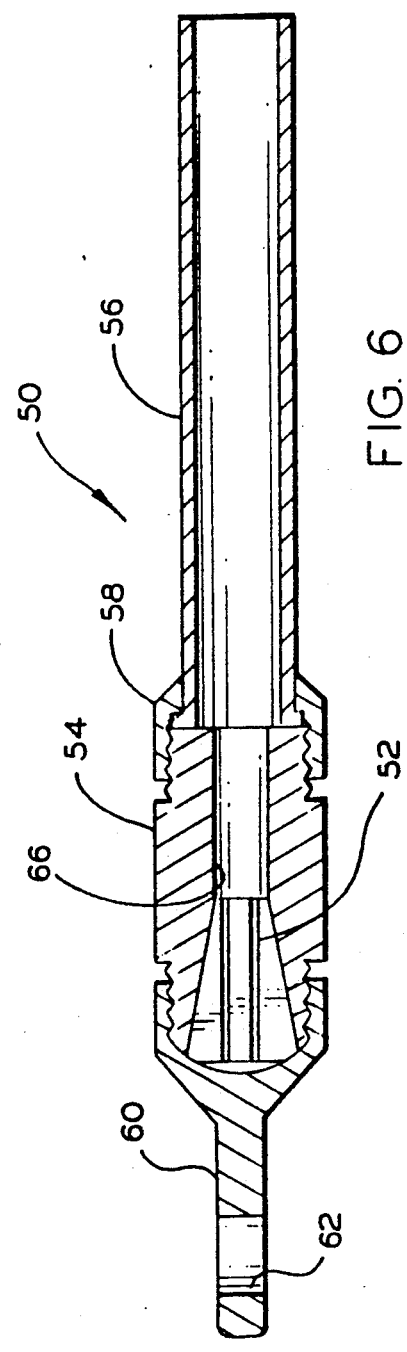

OPTICAL FIBER CABLE PULLING EYE

BACKGROUND OF THE INVENTION

1. Field of the Invention

The present invention relates to devices used to pull optical fiber cables through cable ducts, and more particularly, to such devices for use with optical fiber cables having more than one strength member.

2. Description of the Prior Art

The use of optical fibers is becoming prevalent in the telecommunications and data communications industries, and new building structures are being provided with cable ducts for the subsequent installation of optical fiber cables. Additionally, the telephone companies have found that the space in existing duct systems can be more effectively utilized by the use of optical fiber cable because of its small outer diameter, which is typically less than 0.90 inch.

A typical 4-inch duct has installed therein sub-ducts such as, for example, three 1½-inch sub-ducts, or four 1-inch subducts, through which optical fiber cable is to be installed.

A typical optical fiber cable is formed about a central strength member which may be formed of either a single steel or a dielectric member or a plurality of twisted members. However, newer versions of optical fiber cables have multiple strength members running parallel to one another. Such multiple strength member cables are produced by a number of manufacturers including Alcatel Cable Systems and AT&T.

Due to the fragile nature of optical fibers, pulling cables through pre-installed ducts is a difficult and tedious task. Pulling eye assemblies were devised to facilitate the installation of cables through ducts. The pulling eyes provided a means for gripping the cable and, in particular, the strength components of the cable, so that stresses would not be exerted on the optical fibers while the cable was pulled through the duct system.

Due to the small size of the cable ducts, the cable diameter had to be maintained at a minimum, as did the diameter of the pulling eye assembly. Most existing pulling eyes have too large a diameter and therefore require larger duct sizes. In addition, the pulling eye had to be of such size that it could pass through bends having a predetermined minimum radius. A standard size requirement for pulling eyes is that a cable with an outer diameter of 0.7 inch must pass through a 1-inch sub-duct with a 24-inch bend radius.

SUMMARY OF THE INVENTION

The present invention contemplates a pulling eye assembly to be used for pulling multiple strength member optical fiber cable through ducts. The pulling eye assembly is designed to protect the optical fiber cable during installation.

The first embodiment of the pulling eye uniquely uses a soft metal crimping sleeve having an inner surface adapted to receive the cable diameter. The pulling eye has a gripping body attached to the crimping sleeve. At one end of the gripping body is an eye which allows for lead line or swivel attachment. Extending longitudinally through the gripping body from the other end thereof are a plurality of symmetrically located elongated cavities dimensionally sized to accept the individual ones of the strength members. Once inserted in the cavities, the strength members can be held in place by set screws or by epoxy. Once the strength members are gripped in place in the gripping body, a number of crimps can be placed on the crimping sleeve to engage the outer jacket of the optical fiber cable.

In the second embodiment, the soft metal crimping sleeve is attached to a collet housing. The collet housing is provided with a conical central opening for receiving a pair of collets. The pair of collets are also provided with a plurality of symmetrically located elongated cavities running longitudinally therethrough for receiving the strength members of the optical fiber cable. Once the strength members are passed through the collet housing and placed in the collets, the collets are driven into the conical opening of the collet housing through the use of an eye nut thereby forcibly engaging the cable strength members. The eye nut provides a means of attaching a lead line or swivel. A tubular housing is threadedly disposed over the collet housing and engages the crimping sleeve at one end thereof. The crimping sleeve is then crimped onto the outer jacket of the cable.

A primary objective of the present invention is to provide a pulling eye assembly which may be used to pull optical fiber cables through cable ducts.

Another objective of the present invention is to provide a pulling eye assembly that protects the buffer tubes and optical fibers during installation.

Another objective of the present invention is to provide a pulling eye assembly which grips each cable strength member separately.

Another objective of the present invention is to allow the installation of a cable with an outer diameter of up to 0.7 inch into a 1-inch sub-duct with a 24-inch bend radius.

The invention will be more fully understood when reference is made to the following detailed description taken in conjunction with the accompanying drawings

BRIEF DESCRIPTION OF THE DRAWINGS

FIG. 2 is an elevational view of the first embodiment of the pulling eye assembly;

FIG. 3 is a cross-sectional view taken along the 3—3 line of FIG. 2;

FIG. 4 is a cross sectional view taken along the 4—4 line of FIG. 2;

FIG. 5 is an elevational view of the second embodiment of the pulling eye assembly;

FIG. 6 is a cross-sectional view taken along the 6—6 line of FIG. 5;

FIG. 7 is a cross-sectional view taken along the 7—7 line of FIG. 5; and

FIG. 8 is a perspective view of the collets disassembled from the pulling eye assembly.

DETAILED DESCRIPTION OF THE PREFERRED EMBODIMENTS

Figure 1A:
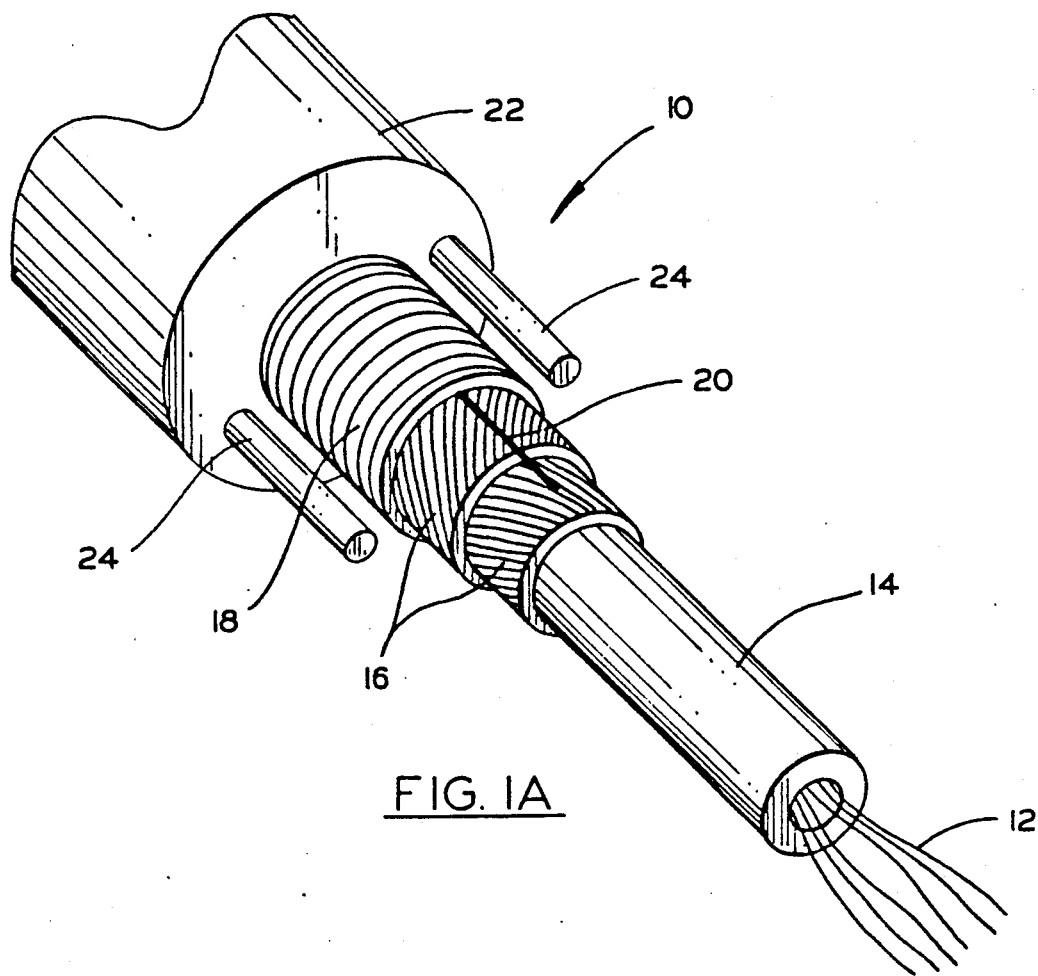
FIG. 1A is a perspective cutaway view showing an optical fiber cable used with the pulling eye assembly of the present invention.

Referring first to FIG. 1A, therein is illustrated a typical optical fiber cable 10 used with the pulling eye assembly of the present invention. The optical fiber cable 10 has a plurality of centrally located optical fibers 12. Carrying the optical fibers 12 is a gel filled plastic buffer tube 14. A plurality of radial strength yarn threads 16 extend along the outside of the buffer tube 14. A strength and protective member in the form of a corrugated steel armor layer 18 may be provided for additional protection against possible rodent damage. The armor 18 is usually coated with a thin layer of plastic material. A ripcord 20 is used to assist in removal of the armor 18. A final polyethylene outer jacket 22 is provided for additional cable protection. Embedded within the outer jacket 22 adjacent the corrugated armor layer 18 is a pair of diametrically opposed strength members 24.

Figure 1B:
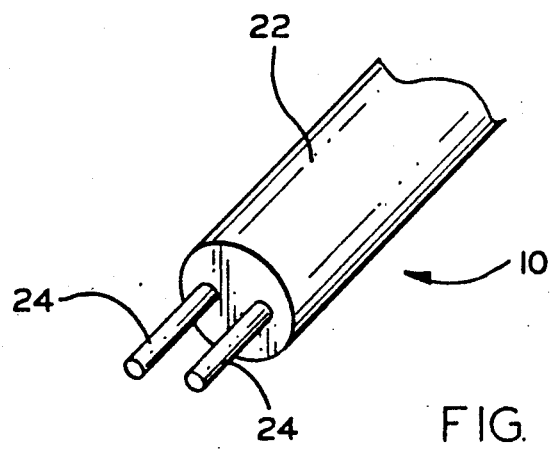
FIG. 1B is a perspective view of the optical fiber cable prepared to be inserted in the pulling eye of the present invention.

Referring to FIGS. 2-4, there is shown the first embodiment of the pulling eye assembly 26 of the present invention which is generally indicated by the numeral 26. The pulling eye assembly 26 primarily consists of a gripping body portion 28 and an attached cable crimping sleeve portion 30. The crimping sleeve portion 30 is formed of a non-corrosive, malleable, electrically conductive metal so it may be crimped over the outer jacket 22 of the optical fiber cable 10. The gripping body portion 28 has an eye aperture 32 which allows for attachment of a lead line or swivel (not shown) for pulling the optical fiber cable 10 through the desired conduit. There are several symmetrically spaced longitudinally directed cavities 33 in the gripping body portion 28. Once the optical fiber cable 10 is stripped as shown in FIG. 1B with the strength members 24 extending from the end thereof, the cable strength members 24 can be slid by the user through the open end of the cable crimping sleeve portion 30 and into the longitudinally directed cavities 33 to be gripped via set-screws 34, or pouring a material such as epoxy (not shown) into the threaded set-screw holes 36. When the cable strength members 24 are metallic, the set-screws 34 would be inserted into the longitudinally directed cavities 33 to clamp down on the strength members 24. When the strength members 24 are made of a dielectric material such as fiberglass, a material such as epoxy would be poured into the set-screw holes 36 and then shorter set-screws would be used to push the material into the longitudinally directed cavities 33. Once the cable strength members 24 are clamped into place by the epoxy and/or set-screws, a number of crimps are placed on the cable crimping sleeve portion 30 in order to engage the cable outer jacket 22.

Turning now to FIGS. 5-8, the pulling eye assembly primarily comprises two collets 52 (FIG. 8) which are designed to grip the cable strength members 24. The collets 52 are tapered and fit into a collet housing 54 which has a similar taper. The collet housing 54 is adapted to receive the pair of collets 52 (FIG. 8) for gripping the cable strength members 24 of the cable 10. The collet holder 52 is formed of a noncorrosive material and includes a central cylindrical portion 64 having a conical opening 66 extending therethrough. Opening 66 is partially conical and partially cylindrical. The conical portion is at an end opposite a crimping sleeve 56 and widens in the direction away from sleeve 56. The cylindrical portion has a diameter approximately equal to the minimum diameter of the conical portion. The ends of the housing 54 are threaded around the exterior to receive a threaded retaining nut 58 and an eye nut 60. The tapered fit causes the gripping force on the strength members 24 to increase as the cable pulling tension increases.

The cable crimping sleeve 56 which has an inner diameter slightly larger than the cable outer diameter is attached to one end of the collet housing 54 by means of the threaded retaining nut 58. The eye nut 60 which has an eye aperture 62 for lead line or swivel attachment is screwed on the other end of the collet housing 54. As the eye nut 60 is tightened onto the collet housing 54, the collets 52 also tighten onto the cable strength members 24. Once the eye nut 60 has been sufficiently tightened onto the collet housing 54, a number of crimps are placed on the crimping sleeve 56 in order to engage the cable outer jacket 22 of the optical fiber cable 10.

During installation of the crimping sleeve 30 or 56 onto the optical fiber cable 10, the various layers of the optical fiber cable 10 are stripped back appropriate distances to expose the strength members 24 as shown in FIG. 1B. The cable is then slid into the crimping sleeve, and the cable strength members 24 are slid into the gripping components 33 or 52. The strength members 24 are then secured to the pulling eye assembly 26 or 50 as heretofore stated. The crimping sleeve 30 or 56 is then crimped onto the cable jacket 22.

Thus, the above-described pulling eye assembly provides a unique structure that satisfies all of the objectives heretofore set forth. The use of the pulling eye assembly allows a multiple strength member cable to be pulled through cable ducts while protecting the fibers in the cable.

The preferred embodiments admirably achieve the objects of the present invention; however, it should be appreciated that departures can be made by those skilled in the art without departing from the spirit and scope of the invention which is limited only by the following claims.

What is claimed is:

1. A pulling eye assembly for an optical fiber cable of the type having one or more grippable strength members and an outer jacket, said pulling eye assembly comprising:
   a housing having one or more longitudinally extending cavities equal in number to the number of strength numbers, said longitudinally extending cavities receiving said one or more strength members;
   a plurality of tapped holes formed in said housing and extending through to said longitudinally extending cavities;
   an adhesive, such as epoxy, disposed in said tapped holes;
   means for gripping the outer jacket of said cable; and
   means for attaching a pulling line.

2. A pulling eye assembly as described in claim 1, wherein the strength members are non-metallic.

3. A pulling eye assembly as described in claim 1, wherein said means for gripping the outer jacket of the cable comprises a crimping sleeve adapted to extend over the outer jacket of said cable and to be crimped thereon.

4. A pulling eye assembly for an optical fiber cable of the type having at least one grippable strength member and an outer jacket, said pulling eye assembly comprising:
   a housing having an opening therethrough for receiving said at least one grippable strength member, said opening being defined at least partially by a conical surface;
   a pair of collets disposed within said housing, whereby said collets may be wedged into said opening while engaging said conical surface and said at least one strength member;
   means for gripping the outer jacket of said cable; and means for attaching a pulling line.

5. A pulling eye assembly as described in claim 4, wherein the collets have a number of longitudinal channels equal to the number of strength members which have a radius slightly smaller than the strength member radius in order to engage said strength members.

6. A pulling eye assembly as described in claim 5, wherein said means for gripping the outer jacket of the cable comprises a crimping sleeve adapted to extend over the outer jacket of said cable and to be crimped thereon.

7. A pulling eye assembly as described in claim 6 wherein the strength members are non-metallic.

8. A pulling eye assembly as described in claim 6 wherein the strength members are metallic.

* * * * *

UNITED STATES PATENT AND TRADEMARK OFFICE
CERTIFICATE OF CORRECTION

PATENT NO. : 5,039,196

DATED : August 13, 1991

INVENTOR(S) : R. Nilsson

It is certified that error appears in the above-identified patent and that said Letters Patent is hereby corrected as shown below:

```
At column 4, line 46, after 'holes', please insert
--wherein said adhesive is distributed throughout
the longitudinally extending cavities by screwing
set-screws into the tapped holes without engaging
the strength members--.
```

Signed and Sealed this

Thirteenth Day of October, 1992

Attest:

DOUGLAS B. COMER

Attesting Officer     Acting Commissioner of Patents and Trademarks